(12) United States Patent
Takano

(10) Patent No.: US 6,168,392 B1
(45) Date of Patent: Jan. 2, 2001

(54) AIR PUMP

(75) Inventor: Yoji Takano, Osaka (JP)

(73) Assignee: Kabushiki Kaisha Tominaga Jyushi Kogyosho, Osaka (JP)

(*) Notice: Under 35 U.S.C. 154(b), the term of this patent shall be extended for 0 days.

(21) Appl. No.: 09/337,272

(22) Filed: Jun. 22, 1999

(51) Int. Cl.⁷ .............................. F04B 39/00; F04B 53/00
(52) U.S. Cl. ............................................ 417/312; 417/413
(58) Field of Search .................................. 417/360, 413, 417/312, 671, 363, 423.15, 413.1, 410.1

(56) References Cited

U.S. PATENT DOCUMENTS

| | | | |
|---|---|---|---|
| 3,597,118 | * 8/1971 | Kilfertz | 417/360 |
| 3,825,374 | * 7/1974 | Kondo | 417/413 |
| 3,838,944 | * 10/1974 | Kolfertz | 417/312 |
| 4,086,037 | * 4/1978 | Stewart | 417/671 |
| 4,406,591 | * 9/1983 | Louis | 417/363 |
| 4,608,000 | * 8/1986 | Tominaga | 417/413 |
| 5,009,579 | * 4/1991 | Grant | 417/413 |
| 5,052,904 | * 10/1991 | Itakura et al. | 417/363 |
| 5,066,204 | * 11/1991 | Point et al. | 417/413 |
| 5,137,432 | * 8/1992 | Tsai | 417/312 |
| 5,282,727 | * 2/1994 | Willinger et al. | 417/423.15 |
| 5,360,323 | * 11/1994 | Hsieh | 417/413.1 |
| 5,554,012 | * 9/1996 | Itakura | 417/410.1 |
| 5,711,656 | * 1/1998 | Tsai | 417/312 |
| 5,716,199 | * 2/1998 | Shan-Chieh | 417/312 |

* cited by examiner

Primary Examiner—Teresa Walberg
Assistant Examiner—Leonid Fastovsky
(74) Attorney, Agent, or Firm—Armstrong, Westerman, Hattori, McLeland & Naughton

(57) ABSTRACT

An air pump includes an outer casing and a pump unit provided in the outer casing. The pump unit includes a diaphragm, a diaphragm-driving unit for driving the diaphragm, and a pump casing to which the diaphragm is attached. The pump casing has an inside space which is divided into an air-inlet side chamber communicating with an inside space of the diaphragm via an inlet opening with an inlet valve and an air-outlet side chamber communicating with the inside space of the diaphragm via an outlet opening with an outlet valve. The pump unit further includes a silencing unit provided in at least one of the chambers. The silencing unit includes an inner pipe having an opened tip end and an outer pipe having a closed bottom end. The outer pipe loosely covers the inner pipe with the closed bottom end facing the opened tip end, whereby air to be introduced into the diaphragm or to be sent out of the diaphragm flows through the silencing unit while changing a flow direction of air at the closed bottom end of the outer pipe.

9 Claims, 5 Drawing Sheets

AIR PUMP

BACKGROUND OF THE INVENTION

1. Field of the Invention

This invention relates to an air pump for supplying air to an aquarium filled with water.

2. Description of the Related Art

It is a popular practice to keep ornamental fishes in an aquarium, enjoying them as a part of an interior of a house or an office. An air pump is generally used for supplying air to water filled in the aquarium.

One example of this kind of conventional air pump is shown in FIG. 11. This air pump has a box-shaped main casing 100 with an opened bottom, an electromagnet 101 fixed to one of the opposing peripheral walls of the main casing 100, an a vibration arm 102 having one end fixed to the other opposing peripheral walls of the main casing 100. On the other end of the vibration arm 102, a permanent magnet 103 is attached so as to oppose to the core portion 101a of the electromagnet 101 at a close distance. A diaphragm 104 made of rubber is attached to a longitudinal central portion of the vibration arm 102. The diaphragm 104 is fitted onto a valve-housing 105 having an inlet opening 106 with an elastic inlet valve 108 and an outlet opening 106 with an elastic outlet valve 107. The opened bottom of the box-shaped main casing 100 is closed by a bottom wall (not shown).

When an alternating current passes through the electromagnet 101, the permanent magnet 103 begins to reciprocate in accordance with the alternative electromagnetic fields of the electromagnet 101 in the direction of the arrow shown in FIG. 11. This causes reciprocative movements of the vibration arm 102, which in turn causes a repetition of expansion and compression of the diaphragm 104. When the diaphragm 104 is compressed, the outlet valve 107 opens to send air confined in the diaphragm 104 out of the main casing 100 through the outlet port 109. On the other hand, when the diaphragm 104 is expanded, the outlet valve 107 closes and the inlet valve 106 opens to introduce air into the diaphragm 104. In accordance with the expansion and compression of the diaphragm 104, air is supplied to the aquarium through the outlet port 109.

However, the aforementioned conventional air pump has drawbacks that it generates relatively loud noise during the operation. The noise can be heard even during the daytime when the air pump is used in a relatively quiet environment such as a house or an office. The noise may make a person uncomfortable. Especially, at nighttime, the noise is augmented because the environment is quieter, which may make the user more uncomfortable, deteriorating the user's concentration, or even disturbing the user's sleep. Thus, the level of noise is beyond the user's endurance range.

As a result, it is strongly required to lower the noise level during the operation of the air pump.

SUMMARY OF THE INVENTION

Therefore, it is one of the objects of the present invention to provide an air pump which can be manufactured at a lower cost and decrease the noise level during its operation.

According to one aspect of the present invention, an air pump includes an outer casing and a pump unit provided in the outer casing. The pump unit includes a diaphragm, a diaphragm-driving unit for driving the diaphragm, and a pump casing to which the diaphragm is attached. The pump casing has an inside space which is divided into an air-inlet side chamber and an air-outlet side chamber. The air-inlet side chamber is communicated with an inside space of the diaphragm via an inlet opening with an inlet valve, and the air-outlet side chamber is communicated with the inside space of the diaphragm via an outlet opening with an outlet valve. The pump unit further includes a silencing unit provided in at least one of the chambers. The silencing unit includes an inner pipe having an opened tip end and an outer pipe having a closed bottom end. The outer pipe loosely covers the inner pipe with the closed bottom end facing the opened tip end, whereby the air to be introduced into the diaphragm or to be sent out of the diaphragm flows through the silencing unit while changing a flow direction of air at the closed bottom end of the outer pipe.

With this air pump, noise generated when air is introduced into and/or sent out of the diaphragm can be decreased effectively by the silencing unit when the air passes through the same.

According to another aspect of the present invention, an air pump includes an electromagnet, a vibration arm driven by the electromagnet, a diaphragm which is expanded and compressed in accordance with vibrational movements of the vibration arm, the diaphragm introducing air therein when expanded and sending out of air therefrom when compressed, and an outer casing for containing components of the air pump. The outer casing is provided with an air-inlet side silencing chamber for passing air to be introduced into the diaphragm and an air-outlet side silencing chamber for passing air to be sent out of the diaphragm. An inner pipe forming an air passage is provided in at least one of the silencing chambers, and the inner pipe is loosely covered by an outer pipe with a closed end portion so as to form an air passage between the inner pipe and the outer pipe.

With this air pump, noise generated when air is introduced into and/or sent out of the diaphragm can be effectively decreased during the air passes through the air passage formed between the inner and outer pipes.

BRIEF DESCRIPTION OF THE DRAWINGS

The above and other objects, features, and advantages of the present invention will be apparent from the following detailed description of the preferred embodiments with reference to the attached drawings, wherein.

DETAILED DESCRIPTION OF THE PREFERRED EMBODIMENTS

An embodiment of the present invention will be explained with reference to the attached drawings.

Figure 1A:
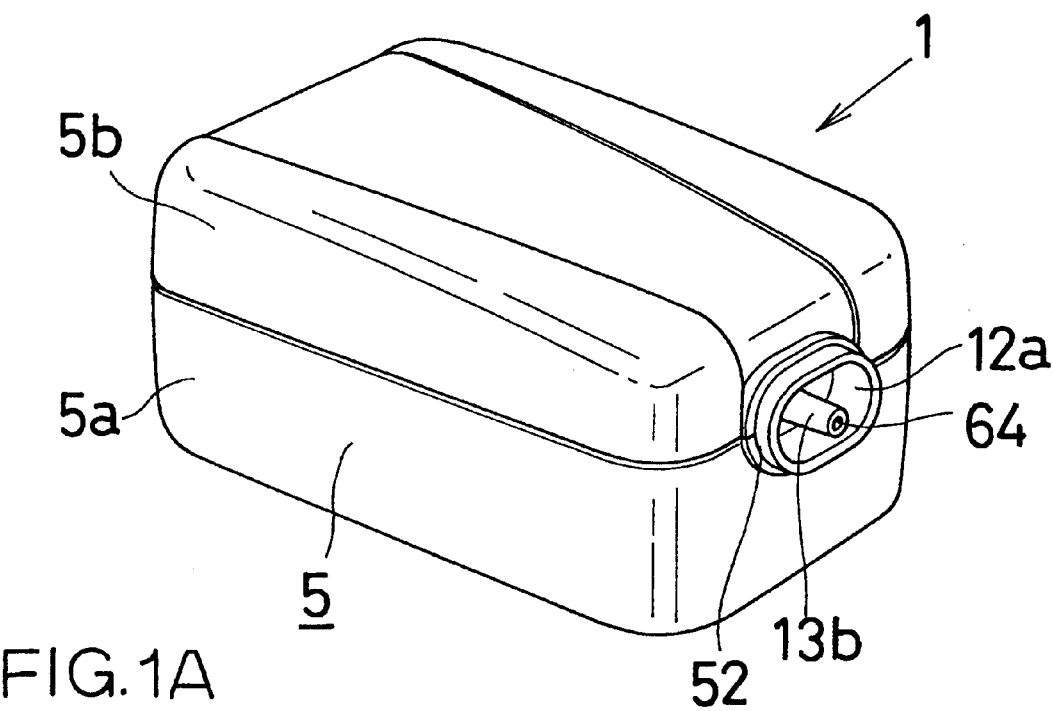
FIG. 1A is a perspective view of an air pump according to one embodiment of the present invention.

As shown in FIG. 1A, the air pump 1 is of a generally rectangular box shape, and the outer casing 5 is comprised of a lower casing 5a with opened upper and lower ends and an upper casing 5b with a closed top wall and an opened lower end. The upper casing 5b is coupled on the lower casing 5a in an air-tight manner. The opened lower end of the lower casing 5a is closed by a bottom wall.

Figure 1B:
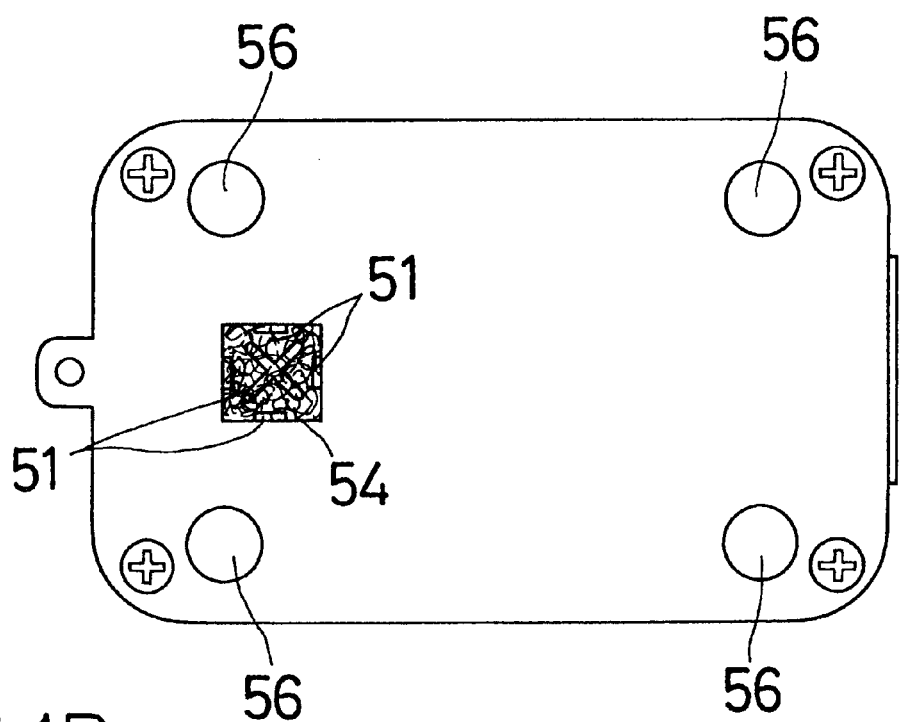
FIG. 1B is a bottom view thereof.

As shown in FIG. 1B, the bottom wall is provided with a plurality of openings 51 for introducing air into the outer casing 5 therethrough. The openings 51 are covered by a filtering member 54 made of synthetic resin fibres, this helps prevent noise generated in the outer casing 5 from leaking out through the openings 51. The bottom wall of the lower casing 5a has, at its each corner portion, a generally cone-shaped hollow supporting leg 56 made of soft materials such as rubber. These soft hollow supporting legs 56 can effectively absorb vibrations of the air pump 1 during the operating, which decreases the transmission of vibrations of the air pump 1 to a table or the like on which the air pump 1 is placed. Accordingly, the noise, which is generated by a resonance of the table or the like, can be effectively decreased.

Figure 2:
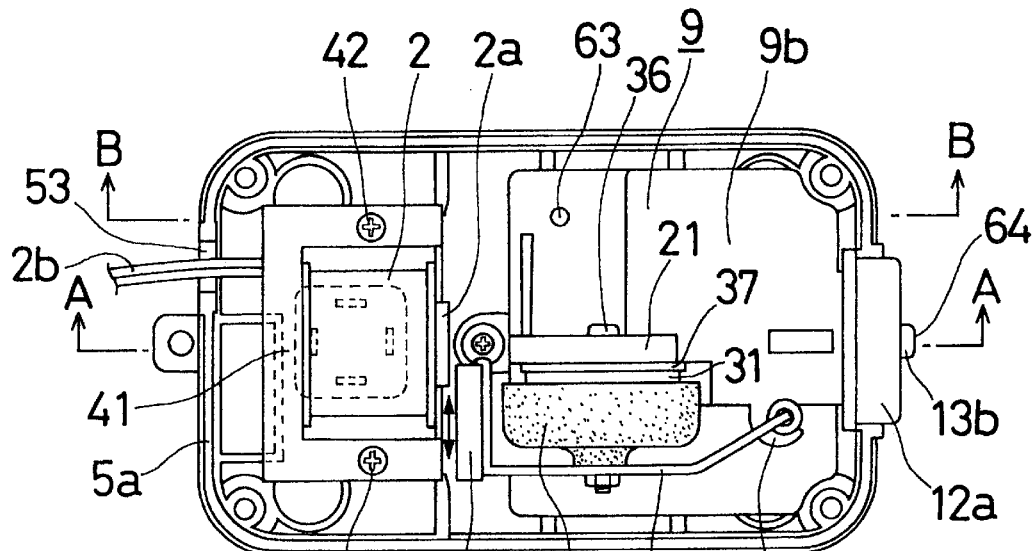
FIG. 2 is a top view of the air pump in a state that the upper casing is removed.

As shown in FIG. 1A, at one of its end walls located along the longitudinal direction of the outer casing 5, a first opening 52 for fitting an outlet portion 12a, which will be described later. As shown in FIG. 2, at the other end wall of the outer casing 5, a second opening 53 for fitting an electric code is provided.

In the outer casing 5, a pump unit is mounted. The pump unit is comprised of a diaphragm 4, a diaphragm driving unit for driving the diaphragm 4 and a pump casing 9 to which the diaphragm 4 is attached.

The diaphragm driving unit includes an electromagnet 2, a vibration arm 3 driven by the electromagnet 2 and a permanent magnet 6 attached an end of the vibration arm 3, whereby the diaphragm 4 is expanded and compressed in accordance with the vibrational movements of the vibration arm 3.

Figure 3:
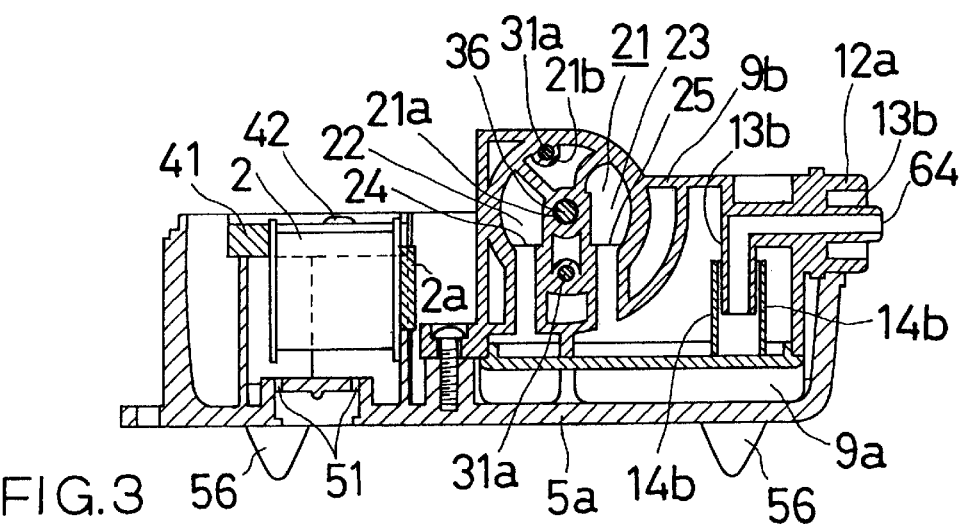
FIG. 3 is a cross-sectional view taken along the lines A—A in FIG. 2.
Figure 4:
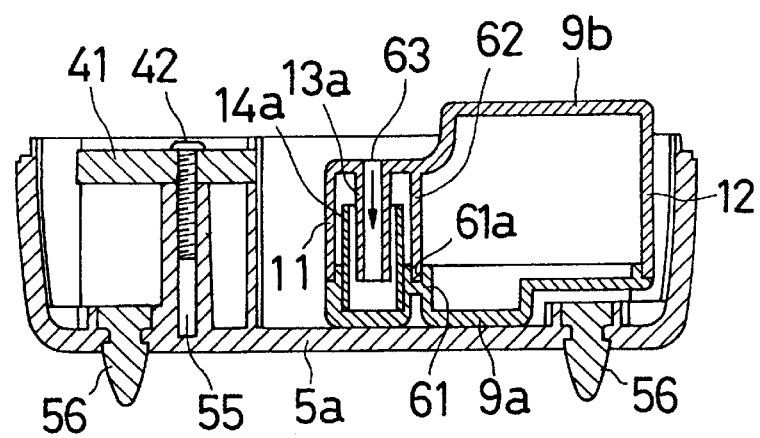
FIG. 4 is a cross-sectional view taken along the lines B—B in FIG. 2.
Figure 5:
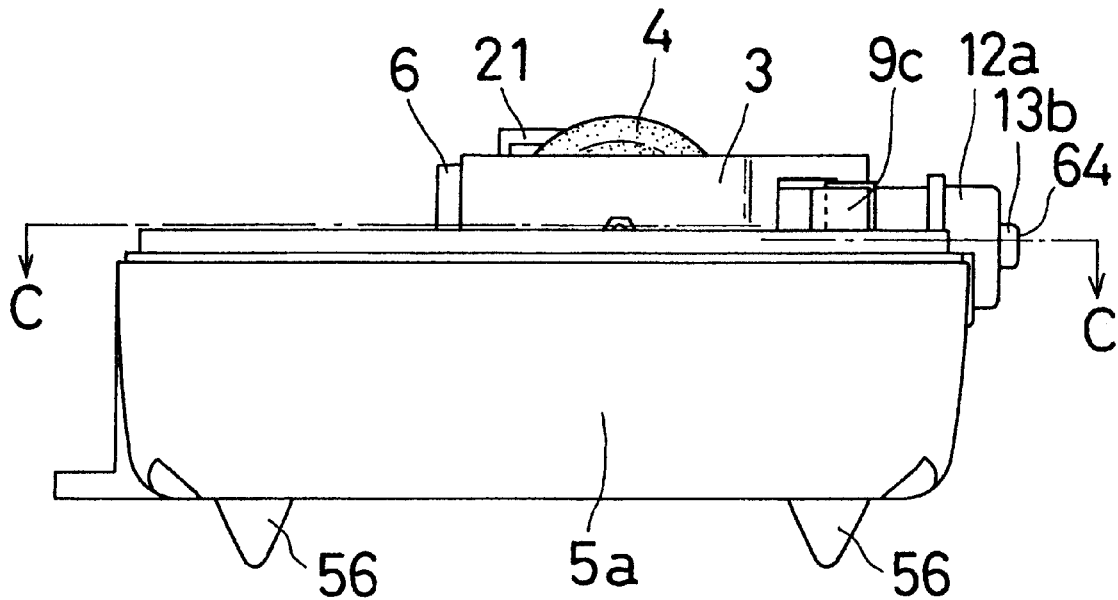
FIG. 5 is a side view of the air pump shown in FIG. 1 in a state that the upper casing is removed.

As shown in FIGS. 2 to 4, the electromagnet 2 is disposed in one side of the lower casing 5a, i.e., the left side of the lower casing 5a, and fixed thereto by tightening up the screws 42 and 42, which penetrates a flange portion 41 of the electromagnet 2 and engaged with a screw hole 55 shaped upwardly and protruded from the bottom wall of the lower casing 5a. The power code 2b connected to the coil of the electromagnet 2 is pulled out of the outer casing 5 through the second opening 53, as shown in FIG. 2.

The pump casing 9 has an inner space divided into an air-inlet side chamber 11 and an air-outlet side chamber 12. The pump casing 9 is comprised of a shallow lower pump casing 9a with an opened upper end and an upper main pump casing 9b airtightly fitted on the lower pump casing 9a. Both the upper and lower pump casings 9a and 9b are synthetic moulded articles.

Figure 8:
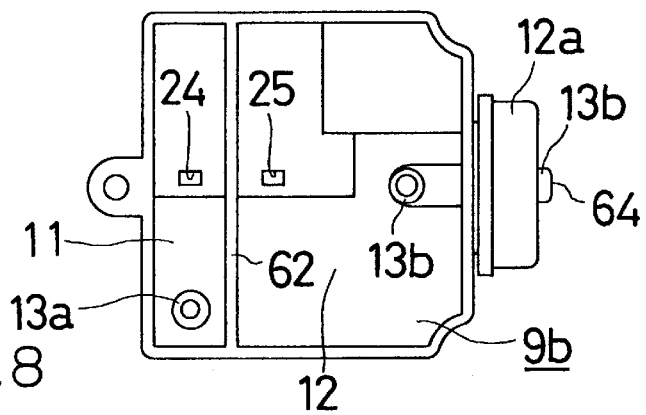
FIG. 8 is a bottom view of the upper main pump casing of the pump unit.
Figure 9:
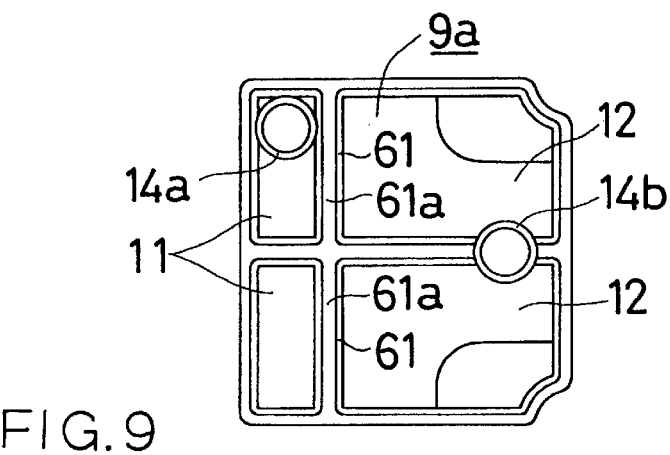
FIG. 9 is a top view of the lower pump casing of the pump unit.

As shown in FIG. 9, the lower pump casing 9a has, at its one side, an upwardly protruded lower partition 61 for partitioning the inside space into the air-inlet side chamber 11 and the air-outlet side chamber 12. Along the upper edge of the lower partition 61, a groove 61a is formed. As shown in FIG. 8, the upper main pump casing 9b has a downwardly protruded upper partition 62 for partitioning the inside space into the air-inlet side chamber 11 and the air-outlet side chamber 12. The upper main pump casing 9b is disposed on the lower pump casing 9a, and the lower end of the upper partition 62 is airtightly fitted in the groove 61a of the lower partition 61, whereby the inside space of the pump casing 9 is divided into two independent chambers 11 and 12, i.e., the air-inlet side chamber 11 and the air-outlet side chamber 12.

As shown in FIG. 2, an air introducing opening 63 is provided on an upper wall forming the air-inlet side chamber 11. In the air-inlet side chamber 11, as shown in FIG. 4, an air-introducing inner pipe 13a is downwardly protruded from the air introducing opening 63. On a lower wall forming the air-inlet chamber 11, an outer pipe 14a having an inner diameter larger than an outer diameter of the inner pipe 13a is upwardly protruded so as to cover the inner pipe 13a. The bottom end of the outer pipe 14a is closed by the lower wall constituting a closed bottom end. Thus, in a state that the upper main pump casing 9b is fitted on the lower pump casing 9a, the outer pipe 14a having the closed bottom end is disposed so as to loosely cover the inner pipe 13a such that the closed bottom end of the outer pipe 14a is apart from the lower end of the inner pipe 13a. Thus, an air passage is formed between the inner pipe 13a and the outer pipe 14a. Therefore, the air introduced through the air introducing opening 63 travels downwardly in the inner pipe 13a to reach the lower wall forming the air-inlet side chamber 11. Then, the flow direction of the air is changed at the bottom of the outer pipe 14a, and the air travels upwardly in the air passage formed between the outer pipe 14a and the inner pipe 13a to be released into the air-inlet side chamber 11. Thus, the inner pipe 13a and the outer pipe 14a with a closed bottom end constitute a silencing unit which can effectively eliminate the leakage of the noise generated in the pump casing 9.

As shown in FIGS. 2 and 3, an outlet portion 12a of the pump casing 9 is outwardly protruded from the side wall forming the air-outlet side chamber 12. Along the central axis of the outlet portion 12a, an air outlet pipe 13b is integrally provided. The air outlet pipe 13b is extended toward the air-inlet side chamber 12 and then downwardly bent. The downwardly bent portion of the air outlet pipe 13b forms an inner pipe 13b of another silencing unit when combined with an outer pipe 14b having an inner diameter larger than an outer diameter of the inner pipe 13b. The outer pipe 14b is upwardly protruded on a lower wall forming the air-outlet chamber 12 so as to cover the inner pipe 13b. The bottom end of the outer pipe 14b is closed by the lower wall constituting a closed bottom end. Thus, in a state that the upper main pump casing 9b is fitted on the lower pump casing 9a, the outer pipe 14b having the closed bottom end is disposed so as to loosely cover the inner pipe 13b, such that the closed bottom end of the outer pipe 14b is apart from the lower end of the inner pipe 13b, and an air passage is formed between the inner pipe 13b and the outer pipe 14b. Therefore, the air to be sent out of the pump casing 9 travels downwardly through the air passage formed between the outer pipe 14b and the inner pipe 13b to reach the lower wall forming the air-outlet side chamber 12. Then, the flow direction of the air is changed at the bottom of the outer pipe 14b, and the air travels upwardly in the inner pipe 13b to be released outside the pump casing 9. Thus, the inner pipe 13b and the outer pipe 14b with the closed bottom end constitute a silencing unit which can effectively eliminate the leakage of the noise generated in the pump casing 9.

Figure 7:
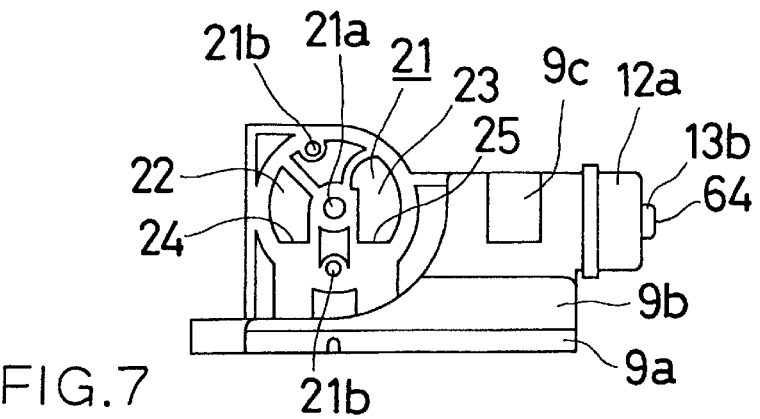
FIG. 7 is a front view of the pump casing mounted in the air pump shown in FIG. 1.
Figure 10:
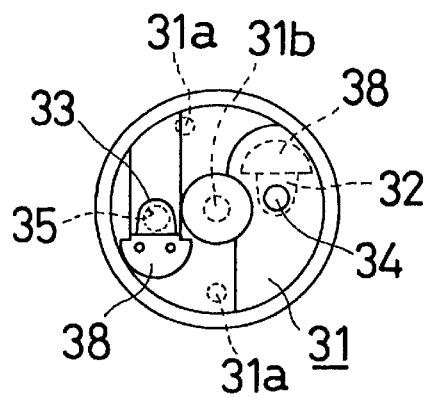
FIG. 10 is a front view of a valve body of the pump unit.
Figure 11:
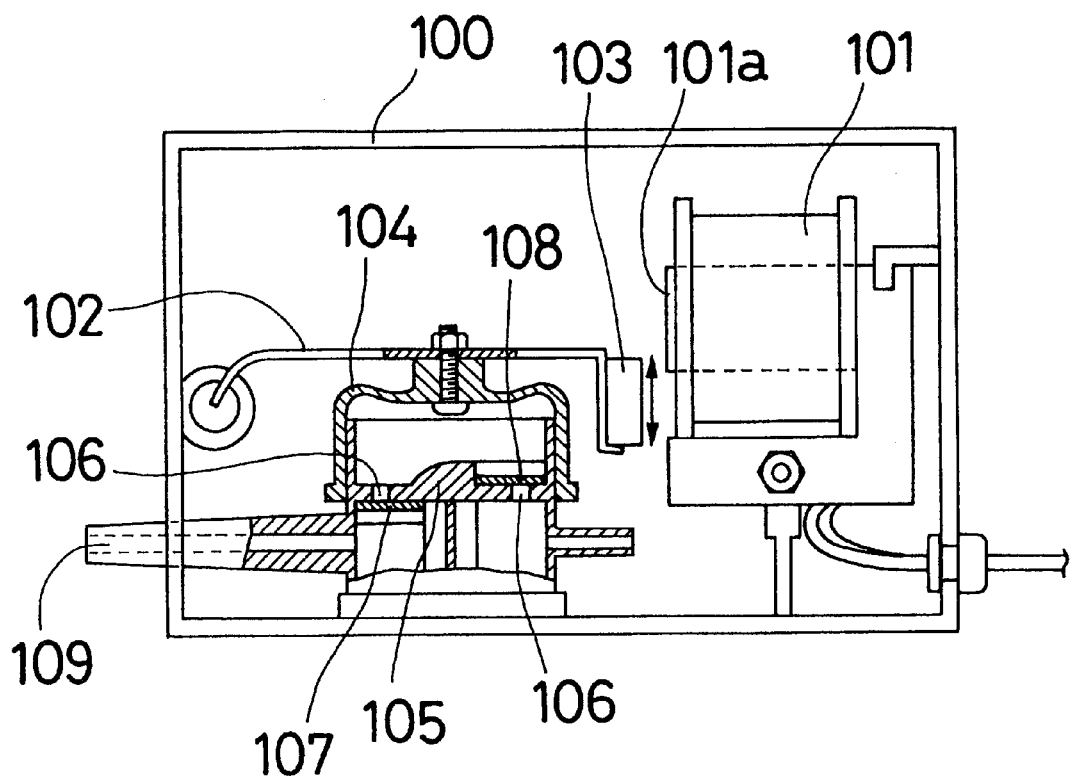
FIG. 11 is a cross-sectional view of a conventional air pump.

As shown in FIG. 7, a vertical plate-shaped diaphragm connecting portion 21 is integrally formed to the upper main pump casing 9b. At the central portion of the diaphragm connecting portion 21, a bolt-insertion hole 21a for fixing a valve body 31 shown in FIG. 10 is formed. Formed at the opposing edge portions of the diaphragm connecting portion 21 are engaging holes 21b and 21b for positioning the valve body 31 and preventing the valve body 31 from rotating around the diaphragm connecting portion 21. At the both sides of the bolt-insertion hole 21a, i.e., the right and left sides of the bolt-insertion hole 21a, an inlet dented portion 22 and an outlet dented portion 23 are formed. The inlet dented portion 22 is in communication with the air-inlet side chamber 11 by way of an inlet port 24 formed in the bottom wall of the inlet dented portion 22. The outlet dented portion 23 is in communication with the air-outlet side chamber 12 by way of an outlet port 25 formed in the bottom wall of the outlet dented portion 23.

Figure 6:
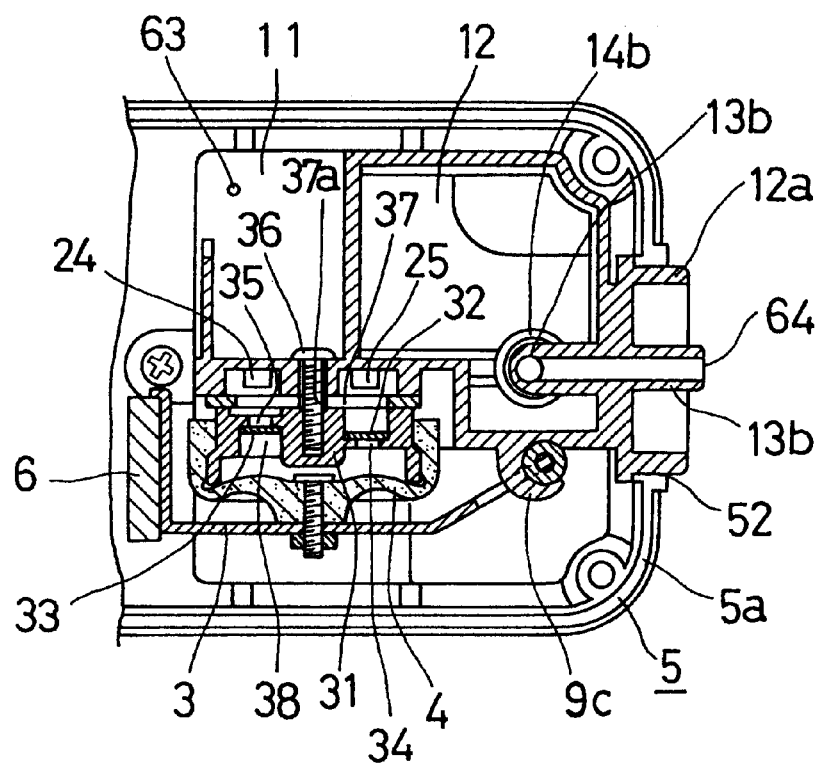
FIG. 6 is a partial cross-sectional view taken along the lines C—C in FIG. 5.

As shown in FIG. 6, a generally cylindrical valve body 31 is attached to the diaphragm connecting portion 21 via a packing 37. Fitted on the valve body 31 is the cup-shaped diaphragm 4 made of rubber. The valve body 31 has a pair of engaging protrusions 31a and 31a as shown in FIG. 10. As shown in FIG. 6, the valve body 31 is connected to the diaphragm connecting portion 21 via the packing 37 by tightening a bolt 36, which is inserted in the bolt-insertion hole 21a of the diaphragm connecting portion 21 and a bolt-insertion hole 37a formed in the packing 37 and engaged with an engaging hole 31b formed in the valve body 31, in a state that the engaging protrusions 31a and 31a are engaged with the engaging holes 21b and 21b.

As shown in FIG. 10, the valve body 31 is provide with an outlet opening 34 and an inlet opening 35 at both sides of the central engaging hole 31b. An outlet valve 32 made of elastic materials is disposed on the outlet opening 34 at the diaphragm connection portion 21 side and is fixed to the valve body 31 at the basal end thereof by a fixing member 38, as shown in FIG. 6. In accordance with the compression of the diaphragm 4, the outlet valve 32 moves toward the diaphragm connection portion 21 to open the outlet opening 34, whereby the air in the diaphragm 4 is forwarded to the outlet port 25 through the outlet opening 34. Thus, the air is sent to the air-outlet side chamber 12 through the outlet port 25. Thereafter, the air is sent out of the pump casing 9 through the outer pipe 14b, the inner pipe 13b and an outlet 64.

On the other hand, an inlet valve 33 made of elastic materials is disposed on the inlet opening 35 at the diaphragm 4 side and is fixed to the valve body 31 at the basal end thereof by a fixing member 38, as shown in FIG. 6. In accordance with the expansion of the diaphragm 4, the inlet valve 33 moves toward the diaphragm 4 to open the inlet opening 35, whereby the air is introduced into the diaphragm 4 through the inlet opening 35. Thus, the air is introduced into the air-inlet side chamber 11 through the inner pipe 13a and the outer pipe 14a. Thereafter, the air is introduced into the diaphragm via the inlet port 24 and the inlet opening 35.

As shown in FIG. 2, the pump casing 9 is provided with a hooking portion 9c for fixing the basal end portion of the vibration arm 3 at a portion near the outlet portion 12a. The basal end portion of the vibration arm 3 is fixed to the hooking portion 9c, and the central portion of the vibration arm 3 is connected to the tip end of the diaphragm 4. In addition, a permanent magnet piece 6 is attached to the free-end of the vibration arm 3. The permanent magnet piece 6 is located so as to face oppose to the core 2a of the electromagnet 2 at a close distance.

When an alternating current passes through the electromagnet 2, the permanent magnet piece 6 begins to reciprocate in the direction of an arrow shown in FIG. 2 in accordance with the alternative electromagnetic fields of the electromagnet 2. This causes reciprocative movements of the vibration arm 3, which in turn causes a repetition of expansion and compression of the diaphragm 4.

When the diaphragm 4 is compressed, the outlet valve 32 moves to open the outlet opening 34 and the inlet valve 33 remains in place to close the inlet opening 35, whereby the air in the diaphragm 4 is forwarded to the outlet port 25 through the outlet opening 34. Thereafter, the air is sent outside the outer casing 5 through the air-outlet side chamber 12, the outer pipe 14b, the inner pipe 13b and an outlet 64.

On the other hand, when the diaphragm 4 is expanded, the inlet valve 33 moves to open the inlet opening 35 and the outlet valve 32 remains in place to close the outlet opening 34, whereby the air is introduced into the diaphragm 4 in accordance with the expansion of the diaphragm 4. Thus, the air is introduced into the outer casing 5 through the openings 51, and then into the air-inlet side chamber 11 through the air introducing opening 63, the inner pipe 13a, the outer pipe 14a, the air-inlet side chamber 11, the inlet port 24 and the inlet opening 35 in this order. Thus, in accordance with the repetition of expansion and compression of the diaphragm 4, air is repeatedly introduced into and sent out of the pump casing 9, resulting in a continuous air supply to the outside through the outlet 64. Accordingly, it is possible to supply air into the aquarium water in such a state that one end of a tube is connected to the outlet 64 and the other end thereof is disposed into the aquarium water.

During the operation of the air pump, hitting-noise is generated when the inlet valve 33 hits on the valve body 31 in accordance with the expansion and the compression of the diaphragm 4. In addition, the vibrations of the diaphragm 4 also produce humming noise. Thus, these noises are generated in the diaphragm 4 when air is introduced into or sent out of the diaphragm 4. However, these noises are effectively decreased by the silencing units each having a dual-pipe structure, one of the silencing units being comprised of the inner pipe 13a and the outer pipe 14a and the other being comprised of the inner pipe 13b and the outer pipe 14b. This effectively can decrease the leakage of noises from the pump casing 9, which in turn can decrease that the noises leak out of the outer casing 5. As a result, the air pump 1 can keep the room where the air pump 1 is disposed silent.

Since the silencing unit is comprised of the inner pipe 13a or 13b and the outer pipe 14a or 14b, the silencing unit can be simple in structure, resulting in an easy manufacturing and a low manufacturing cost.

Although the present invention has been described based on the preferred embodiment, the terms and the content used in this specification are explanatory, and not limited to the present invention. It should be appreciated that there are many modifications and substitutions without departing from the spirit and scope of the present invention.

What is claimed is:

1. An air pump, comprising:
   an outer casing; and
   a pump unit provided in said outer casing, wherein said pump unit includes:
   a diaphragm;
   a diaphragm-driving unit for driving said diaphragm;
   a pump casing to which said diaphragm is attached, said pump casing having an inside space which is divided into an air-inlet side chamber communicating with an inside space of said diaphragm via an inlet opening with an inlet valve and an air-outlet side chamber communicating with the inside space of said diaphragm via an outlet opening with an outlet valve; and a silencing unit provided in at least one of said chambers, wherein said silencing unit comprises an inner pipe having an opened tip end and an outer pipe having a closed bottom end, and wherein said outer pipe loosely covers said inner pipe with said closed bottom end facing said opened tip end, whereby air to be introduced into said diaphragm or to be sent out of said diaphragm flows through said silencing unit while changing a flow direction of the air at said closed bottom end of said outer pipe.

2. The air pump as recited in claim 1, wherein said diaphragm-driving unit comprises an electromagnet, and a vibration arm driven by said electromagnet in a reciprocative manner, and wherein said diaphragm is expanded and compressed in accordance with reciprocative movements of said vibration arm.

3. The air pump as recited in claim 1, wherein said silencing unit is provided in each of said chambers.

4. The air pump as recited in claim 1, wherein said pump casing has an air introducing opening from which said inner pipe is protruded in communication therewith.

5. The air pump as recited in claim 1, wherein said pump casing has an air outlet opening, and wherein said inner pipe of said silencing unit is extended from said air outlet opening.

6. The air pump as recited in claim 1, wherein said outer casing has a sealing structure having an opening through which an inside space of said outer casing is in communication with an outside of said outer casing.

7. The air pump as recited in claim 6, wherein said air opening is provided at a bottom wall of said outer casing.

8. An air pump, comprising:

an electromagnet;

a vibration arm driven by said electromagnet;

a diaphragm which is expanded and compressed in accordance with vibrational movements of said vibration arm, said diaphragm introducing air therein when expanded and sending out of air therefrom when compressed; and an outer casing for containing components of said air pump, wherein said outer casing is provided with an air-inlet side silencing chamber for passing air to be introduced into said diaphragm and an air-outlet side silencing chamber for passing air to be sent out of said diaphragm, and wherein an inner pipe forming an air passage is provided in at least one of said silencing chambers, said inner pipe being loosely covered by an outer pipe with a closed end bottom so as to form an air passage between said inner pipe and the outer pipe.

9. The air pump as recited in claim 8, wherein said inner pipe is provided in each of said silencing chambers, and each of said inner pipes is loosely covered by said outer pipe.

* * * * *